No. 797,112. PATENTED AUG. 15, 1905.
A. DE HEMPTINNE.
PROCESS OF CONVERTING OLEIC ACID INTO STEARIC ACID.
APPLICATION FILED FEB. 7, 1905.
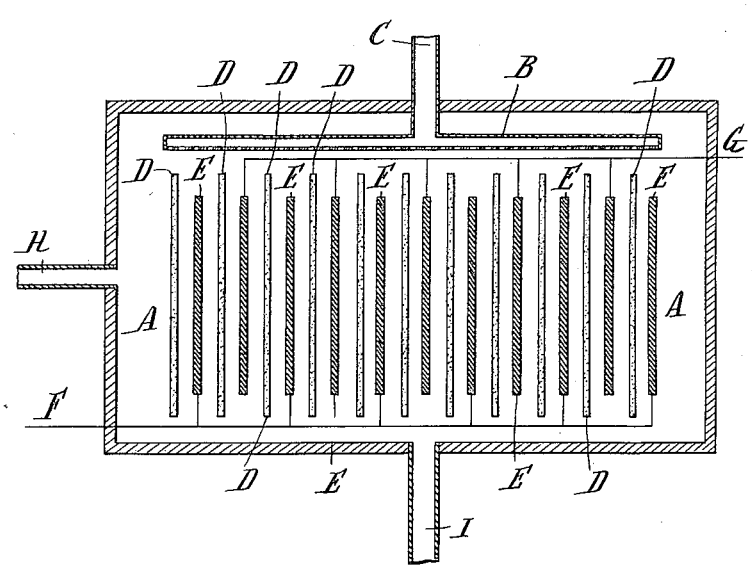
Witnesses
George G. Schoenlank
Thomas Kirkpatrick
Inventor
Alexandre de Hemptinne
by H. van Dedemuel
Attorney

UNITED STATES PATENT OFFICE.

ALEXANDRE DE HEMPTINNE, OF GHENT, BELGIUM.

PROCESS OF CONVERTING OLEIC ACID INTO STEARIC ACID.

No. 797,112. Specification of Letters Patent. Patented Aug. 15, 1905.

Application filed February 7, 1905. Serial No. 244,666.

*To all whom it may concern:*

Be it known that I, ALEXANDRE DE HEMPTINNE, university professor, a subject of the King of Belgium, and a resident of 56 Rue de la Vallée, Ghent, Belgium, have invented a certain new and useful Process of Converting Oleic Acid into Stearic Acid and Like Compounds, of which the following is a specification.

This invention relates to a process for converting oleic acid (commercial olein) into stearic acid and other similar compounds whose melting-point is higher than that of the olein.

The process is based on the fact that olein and like compounds can be hydrogenized when subjected to the influence of electric effluvia. In this manner a considerable quantity of stearic acid may be formed, according to the reaction $C_{18}H_{34}O_2 + H_2 = C_{18}H_{36}O_2$.

During the process there are also formed polymerids of stearic acid and analogous compounds having melting-points more or less in the neighborhood of 69° centigrade, whereas olein is liquid at the ordinary temperature.

The conversion may be effected in hermetically-closed apparatus containing hydrogen maintained at a constant pressure by a suitable device.

Experiment has shown that it is preferable to operate at a pressure that is lower than that of the atmosphere.

The electric effluvia are produced between a series of metal plates arranged parallel to one another and rather close together. A plate of glass or other insulator must always separate two consecutive metal plates to avoid short-circuiting and to produce uniform effluvia. Alternate metal plates are connected together and with one of the poles of the source of electricity by a conductor. Similarly, the remaining metal plates are connected together and with the other pole.

By a device for sprinkling the plates or by any other suitable arrangement the surface of the plates is covered with a thin mobile layer of olein, which is thus subjected in the presence of the hydrogen to the action of the electric effluvia between the plates. Under these conditions the olein absorbs the gas, so as to form stearin (stearic acid) in considerable quantity, as well as other analogous substances of higher melting-point than that of the olein, (oleic acid.)

The accompanying diagram is a vertical section of the apparatus.

A is a chamber wherein the conversion is effected. It is connected by a pipe H with a source of hydrogen under constant pressure. The oleic acid is supplied by a pipe C to a sprinkling device B, which discharges the acid onto a system of parallel plates D E, D E, consisting of glass and metal alternately. Alternate metal plates are connected together and with one of the poles of the source of electricity by a wire F, the remaining metal plates being connected together and with the other pole by a wire G. The liquid, which flows in a thin layer over the surface of the plates, is by this means subjected to the action of the electric effluvia, and it accumulates at the bottom of the chamber, whence it may be withdrawn through a pipe I, to be introduced again into the apparatus for the purpose of being subjected a second time to the action of the electric effluvia. This process is repeated until about twenty or thirty per cent. of the oleic acid has been converted into stearic acid.

Owing to the rise of temperature, due to the passage of the electric effluvia, the solid products formed remain in solution in the oleic acid and are not deposited on the plates. The liquid, containing about twenty to thirty per cent. of stearic acid, is then introduced into a receiver or a refrigerating apparatus. The solid products are deposited and the oleic acid, which is separated by filtration or by decantation, is put back into the apparatus with a fresh quantity of the acid. These operations may be repeated indefinitely.

It is to be understood that the invention is not limited to the arrangement here shown. For instance, the plates may be arranged differently. Thus, for example, the glass plates may be in immediate contact with the metal plates or each metal plate may be placed between two glass plates. The system for sprinkling may also be modified. Thus a thin mobile layer of oleic acid may be produced on the surface of the plates by causing a system of parallel plates partially immersed in the oil to rotate in a cylinder. However, the invention is not concerned with the numerous modifications of apparatus for practicing it, which are cited here merely as illustrations.

Having now described my invention and in what manner the same is to be performed, what

I claim as new, and desire to secure by Letters Patent, is—

A process for converting oleic acid into stearic acid and like compounds of higher melting-point than that of the oleic acid, consisting in subjecting the oleic acid to the action of electric effluvia in an atmosphere of hydrogen, substantially as described.

In testimony whereof I have signed my name to this specification in the presence of two subscribing witnesses.

ALEXANDRE DE HEMPTINNE.

Witnesses:
GREGORY PHELAN,
ED. CHIRIONET.